(12) United States Patent
Kochpatcharin et al.

(10) Patent No.: US 7,363,236 B2
(45) Date of Patent: Apr. 22, 2008

(54) SYSTEM, APPARATUS AND METHOD FOR RETICLE GRADE AND PRICING MANAGEMENT

(75) Inventors: Danchai Kochpatcharin, Singapore (SG); Jennifer Su Ping Teong, Singapore (SG); Yee Hwee Phuan, Singapore (SG); Elizabeth Lim, Singapore (SG); Kenneth Zoo Khean Ngeow, Singapore (SG); Winson Yong, Sunnyvale, CA (US)

(73) Assignee: Chartered Semiconductor Manufacturing Ltd., Singapore (SG)

( * ) Notice: Subject to any disclaimer, the term of this patent is extended or adjusted under 35 U.S.C. 154(b) by 935 days.

(21) Appl. No.: 10/389,477

(22) Filed: Mar. 14, 2003

(65) Prior Publication Data

US 2004/0181458 A1    Sep. 16, 2004

(51) Int. Cl.
*G06Q 99/00* (2006.01)
(52) U.S. Cl. .............................. 705/1; 705/26; 705/37
(58) Field of Classification Search ............... 705/400, 705/1, 26, 37; 700/117, 121; 430/5
See application file for complete search history.

(56) References Cited

U.S. PATENT DOCUMENTS

| | | | |
|---|---|---|---|
| 4,835,704 A | | 5/1989 | Eichelberger et al. |
| 5,663,017 A | * | 9/1997 | Schinella et al. ............... 430/5 |
| 5,696,943 A | | 12/1997 | Lee |
| 5,717,928 A | | 2/1998 | Campmas |
| 5,960,405 A | | 9/1999 | Trefethan |
| 6,031,981 A | | 2/2000 | Lee |
| 6,128,588 A | | 10/2000 | Chacon |
| 6,253,187 B1 | | 6/2001 | Fox |
| 6,260,177 B1 | | 7/2001 | Lee |
| 6,303,251 B1 | | 10/2001 | Mukai |
| 6,529,790 B1 | * | 3/2003 | Magee et al. ............... 700/121 |
| 6,622,295 B1 | | 9/2003 | Schepp |

(Continued)

FOREIGN PATENT DOCUMENTS

EP    1156431 A2    11/2001

(Continued)

OTHER PUBLICATIONS www.icknowledge.com.*

(Continued)

*Primary Examiner*—John W. Hayes
*Assistant Examiner*—Freda A Nelson
(74) *Attorney, Agent, or Firm*—William J. Stoffel

(57) ABSTRACT

A method, apparatus and system are provided for determining the price of a reticle set. The system retrieves information related to a specific reticle set from various data sources (e.g., data bases) and determines a price for the reticle set. An example embodiment of the method of the invention for calculating a price of a reticle set comprises:
  a) receiving customer information for the reticle set and storing the customer information;
  b) receiving sales order data for the reticle set and storing the sales order data;
  c) retrieving layer information for the reticle set and storing the layer information;
  d) retrieving cost data for the layer information for the reticle set and storing the cost data;
  e) determining the price of the reticle set using the layer information, the sales order data, and the cost data; and storing the price of the reticle set; and
  f) outputting the price of the reticle set.

28 Claims, 12 Drawing Sheets

U.S. PATENT DOCUMENTS

| | | |
|---|---|---|
| 6,756,242 B1 | 6/2004 | Regan |
| 6,760,640 B2 | 7/2004 | Suttile |
| 6,774,380 B2 | 8/2004 | Abe |
| 6,842,881 B2 | 1/2005 | Croke |
| 2001/0052107 A1 | 12/2001 | Anderson |
| 2002/0100005 A1 | 7/2002 | Anderson |
| 2002/0143424 A1* | 10/2002 | Mori et al. ............... 700/121 |
| 2003/0126153 A1* | 7/2003 | Clairmont et al. ....... 707/104.1 |
| 2003/0177469 A1 | 9/2003 | Suttile |
| 2003/0179605 A1 | 9/2003 | Riesenman |
| 2004/0006485 A1* | 1/2004 | Weed et al. ................... 705/1 |
| 2004/0054633 A1 | 3/2004 | Hugghe |
| 2004/0093471 A1 | 5/2004 | Riesenman |
| 2004/0107412 A1 | 6/2004 | Pack |

FOREIGN PATENT DOCUMENTS

| | | | |
|---|---|---|---|
| EP | 1164522 | A2 | 12/2001 |

OTHER PUBLICATIONS

Litt, Lloyd C., "The Price of Success: The Cost of Lithography for the 130nm Node", (Jul. 1, 2001), Future Fab Intl. vol. 10, 8 pgs.* ICknowledge.com.*

* cited by examiner

Section A: Customer Information

Customer ID: 1362

Section B: Device Information

Device ID(as in STF): 2AM7-1802-S1

```
2AF7-1803-S1-U01-F2
2AG1-1801-S1
2AG1-1801-S1-U01-F2
2AG1-1801-S1-U02
2AM7-1802-S1
```
— 308

— 310

Please Click on this Checkbox to Select Process ID ☑

Process ID(as in BX024): 6-L1B18-16A-1833ZZ-000-02A

```
6-L1B18-16A-1833ZZ-000-02A
6-L1B18-16A-1833ZZ-000-02B
6-L1B18-16A-1833ZZ-000-T0A
6-L1B18-16A-1833ZZ-000-T0C
6-L1B18-16A-1833ZZ-000-T0D
```
— 312

— 314

[ Generate Process Information ] — 316

| | | | |
|---|---|---|---|
| Customer ID: | 306 | 1362 | |
| Customer Name: | 302 | AGILENT TECHNOLOGIES INC | |
| Device ID: | | 2AM7-1802-S1 | 310 |
| Process ID: | 314 | 6-L1818-16A-1833ZZ-000-02A | |
| Technology: | 322 | 0.18UM | |
| Sales Order #: | 326 | 2299546 | 324 / 328 |
| Sales Order Amount US$: | | 281543.68 | |
| Recoverable: | 330 | Yes ● No ○ | |
| Account Number: | 332 | | |
| Mask Shop: | 334 | TAIWAN MASK CORPORATION | |
| Delivery Location: | 338 | CSP - FAB6 | 336 |

Status:
FAB: CSP   340

Layer Information   342

| Sel. | Layer | Name | Pellicle Type | Reticle Grade | Rev | OPC/PSM | Maj. | Spot Size | CD Cell Size | Price(USD) | Description |
|---|---|---|---|---|---|---|---|---|---|---|---|

Status:
FAB: CSP

Layer Information

| Sel | Layer | Name | Pellicle Type | Reticle Grade | Rev | OPC/PSM | Mag | Spot Size | CD Cell Size | Price(USD) | Description |
|---|---|---|---|---|---|---|---|---|---|---|---|
| ☑ | 10 | COMP | K-248 | G+ | AZ | OPC | ASML4x | 0.02 | 0.22 | 15000 | AGILENT TECHNOLOGIES INC,2AM7-1802-S1, |
| ☑ | 11 | AD | K-248 | E | AZ | NONE | ASML4x | 0.04 | 0.40 | 5500 | AGILENT TECHNOLOGIES INC,2AM7-1802-S1, |
| ☑ | 05 | N-WELL | K-248 | A | AZ | NONE | ASML4x | 0.04 | 0.60 | 2400 | AGILENT TECHNOLOGIES INC,2AM7-1802-S1, |
| ☑ | 15 | P-FIELD | K-248 | A | AZ | NONE | ASML4x | 0.04 | 0.60 | 2400 | AGILENT TECHNOLOGIES INC,2AM7-1802-S1, |
| ☑ | 64 | ThinPgate | K-248 | C | AZ | NONE | ASML4x | 0.04 | 0.40 | 3200 | AGILENT TECHNOLOGIES INC,2AM7-1802-S1, |
| ☑ | 61 | ThinNgate | K-248 | C | AZ | NONE | ASML4x | 0.04 | 0.40 | 3200 | AGILENT TECHNOLOGIES INC,2AM7-1802-S1, |
| ☑ | 38 | DualGate | K-248 | A | AZ | NONE | ASML4x | 0.04 | 0.70 | 2400 | AGILENT TECHNOLOGIES INC,2AM7-1802-S1, |
| ☑ | 59 | Predope | K-248 | C | AZ | NONE | ASML4x | 0.04 | 0.40 | 3200 | AGILENT TECHNOLOGIES INC,2AM7-1802-S1, |
| ☑ | 60 | POLY2 | K-248 | H+ | AZ | OPC | ASML4x | 0.02 | 0.18 | 22000 | AGILENT TECHNOLOGIES INC,2AM7-1802-S1, |
| ☑ | 62 | HVN | K-248 | C | AZ | NONE | ASML4x | 0.04 | 0.40 | 3200 | AGILENT TECHNOLOGIES INC,2AM7-1802-S1, |
| ☑ | 23 | HV_P | K-248 | C | AZ | NONE | ASML4x | 0.04 | 0.40 | 3200 | AGILENT TECHNOLOGIES INC,2AM7-1802-S1, |
| ☑ | 65 | N+ | K-248 | C | AZ | NONE | ASML4x | 0.04 | 0.40 | 3200 | AGILENT TECHNOLOGIES INC,2AM7-1802-S1, |
| ☑ | 70 | P+ | K-248 | C | AZ | NONE | ASML4x | 0.04 | 0.40 | 3200 | AGILENT TECHNOLOGIES INC,2AM7-1802-S1, |
| ☑ | 68 | SAL-BLK | K-248 | B | AZ | NONE | ASML4x | 0.04 | 0.43 | 2600 | AGILENT TECHNOLOGIES INC,2AM7-1802-S1, |

SYSTEM, APPARATUS AND METHOD FOR RETICLE GRADE AND PRICING MANAGEMENT

CROSS-REFERENCE TO RELATED APPLICATIONS

This application is related to U.S. patent application Ser. No. 10/389,718, filed Mar. 14, 2003, inventors Kochpatcharin et al., entitled SYSTEM, APPARATUS AND METHOD FOR AUTOMATED TAPEOUT SUPPORT, now issued U.S. Pat. No. 7,069,533, issued on Jun. 27, 2006, commonly assigned which is hereby incorporated by reference.

BACKGROUND OF INVENTION

1) Field of the Invention

This invention relates generally to a method, apparatus and system for pricing product and more particularly to a method, apparatus and system for the reticle grade and pricing management and more particularly to a method, apparatus and system for pricing a reticle or mask set used in semiconductor fabrication.

2) Description of the Prior Art

Electronic device makers, such as cell phone manufactures, computer manufactures, toy makers, use foundries or IC manufactures to make the chips used in their products. To make the chips, the photolithographic masks or reticles sets are used in the manufacturing process. The reticle sets must be fabricated before the chips can be made. The electronic device makers make preliminary chip designs using chip design programs. The device designers send the preliminary chip designs to foundries or semiconductor manufacturers to make the reticle sets (masks) and then fabricate the devices using the reticle sets (masks).

Foundries need to determine the cost to produce of the reticle sets for the devices. This is a complicated process because each reticle set is customized for the device being manufactured. The foundries use the cost of the reticle set to make business and pricing decisions.

The importance of overcoming the various deficiencies noted above is evidenced by the extensive technological development directed to the subject, as documented by the relevant patent and technical literature. The closest and apparently more relevant technical developments in the patent literature can be gleaned by considering: U.S. Pat. No. 6,031,981 (Lee et al.) that describes a system for reconfigurable gate array cells for automatic engineer change orders. U.S. Pat. No. 6,128,588 (Chacon) shows an integrated Fab database and discusses connections to a control system. U.S. Pat. No. 6,260,177b1 (Lee et al.) discusses tapeout processes in reticle fabrication. U.S. Pat. No. 5,696,943 (Lee) shows a method and apparatus for design modification.

SUMMARY OF THE INVENTION

It is an object of example embodiments of the present invention to provide a method, system and apparatus for Reticle Grade and Pricing Management.

An non-limiting example embodiment of the method of the invention for calculating a price of a reticle set comprises:
  a) receiving layer information for a reticle set and storing said layer information;
  b) receiving cost data for said layer information for the reticle set and storing said cost data;
  c) determining the price of said reticle set using said layer information and said cost data;
  and storing the price of the reticle set; and
  d) outputting the price of said reticle set.

Another non-limiting example embodiment is one or more processor readable storage devices having processor readable code embodied on the process readable storage devices, the processor readable code for programming one or more processors to perform a method of determining a price of a reticle set; the method comprising:
  a) receiving customer information for the reticle set and storing the customer information;
  b) receiving sales order data for the reticle set and storing the sales order data;
  c) retrieving layer information for the reticle set and storing the layer information;
  d) receiving cost data for the layer information and storing the cost data;
  e) determining the price of the reticle set using the layer information, the sales order data, and the cost data; and storing the price of the reticle set; and
  f) outputting the price of the reticle set.

Another non-limiting example embodiment is a computer system for determining a price of a reticle set comprising:
  a) means for receiving customer information for the reticle set and storing the customer information;
  b) means for receiving sales order data for the reticle set and storing the sales order data;
  c) means for receiving layer information for the reticle set and storing the layer information;
  d) means for receiving cost data for the layer information for the reticle set and storing the cost data;
  e) means for determining the price of the reticle set using the layer information, the sales order data, and the cost data; and storing the price of the reticle set; and
  f) means for outputting the price of the reticle set.

The above advantages and features are of representative embodiments only, and are not exhaustive and/or exclusive. They are presented only to assist in understanding the invention. It should be understood that they are not representative of all the inventions defined by the claims, to be considered limitations on the invention as defined by the claims, or limitations on equivalents to the claims. For instance, some of these advantages may be mutually contradictory, in that they cannot be simultaneously present in a single embodiment. Similarly, some advantages are applicable to one aspect of the invention, and inapplicable to others. Furthermore, certain aspects of the claimed invention have not been discussed herein. However, no inference should be drawn regarding those discussed herein relative to those not discussed herein other than for purposes of space and reducing repetition. Thus, this summary of features and advantages should not be considered dispositive in determining equivalence. Additional features and advantages of the invention will become apparent in the following description, from the drawings, and from the claims.

BRIEF DESCRIPTION OF THE DRAWINGS

The features and advantages of a method, apparatus and system for pricing a reticle or mask set according to the present invention and further details of a process of fabricating such a method, apparatus and system in accordance with the present invention will be more clearly understood from the following description taken in conjunction with the accompanying drawings in which like reference numerals designate similar or corresponding elements, regions and portions and in which:

FIGS. 3A, 3B, 3C, 3D and 3E show interfaces in accordance with a non-limiting example embodiments of the invention.

DETAILED DESCRIPTION OF THE PREFERRED EMBODIMENTS

Example embodiments for a method, apparatus and system are provided for determining the price of a reticle set. Embodiments of the system retrieve information related to a specific reticle set from various data sources (e.g., data bases) and determines a price for the reticle set.

Figure 2A:
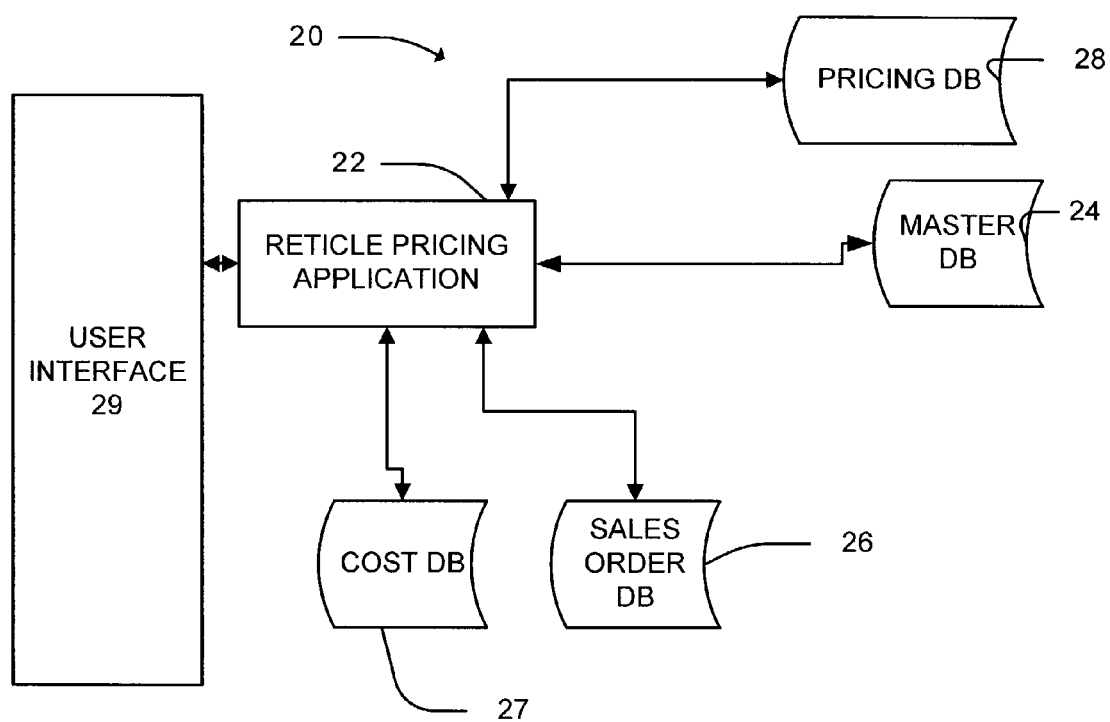
FIG. 2A is a diagram of a system of a non-limiting example embodiment of the pricing system.
Figure 2B:
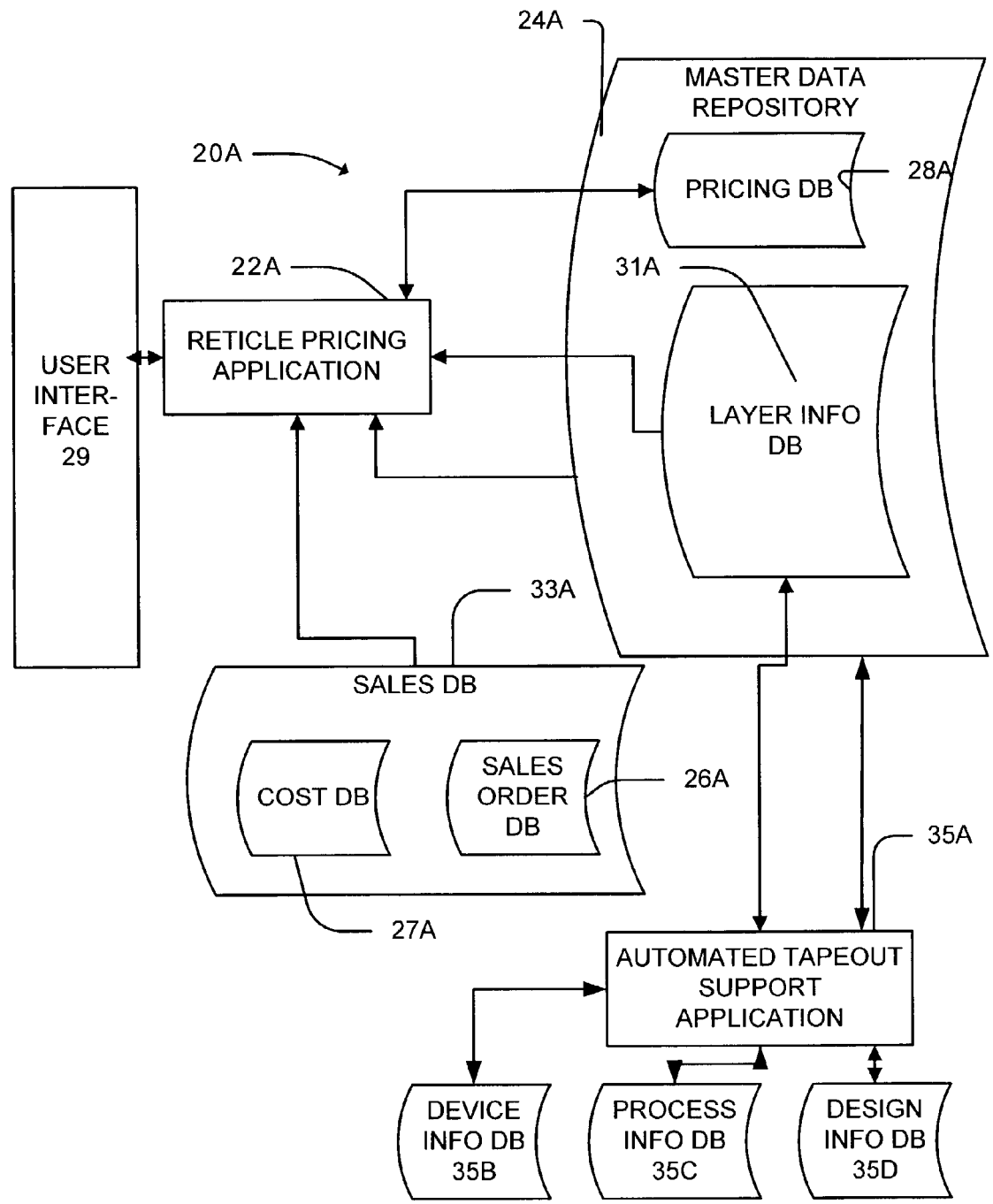
FIG. 2B is a diagram of a system of a non-limiting example embodiment of the pricing system having an automated tapeout support application connected to the master database.

In a non-limiting example shown in FIG. 2B, the pricing system has an automated tapeout support application 35A connected to the master database 24A. The automated tapeout support system provides "layer information" about the reticle design (e.g., layer information) that is stored in the master data repository. A layer is one reticle in a set of reticles used to make a chip or device. The pricing application uses the "layer information" to determine the price of the reticle set. See e.g., FIG. 3D for examples of layer information data.

FIG. 1 Overview

Figure 1:
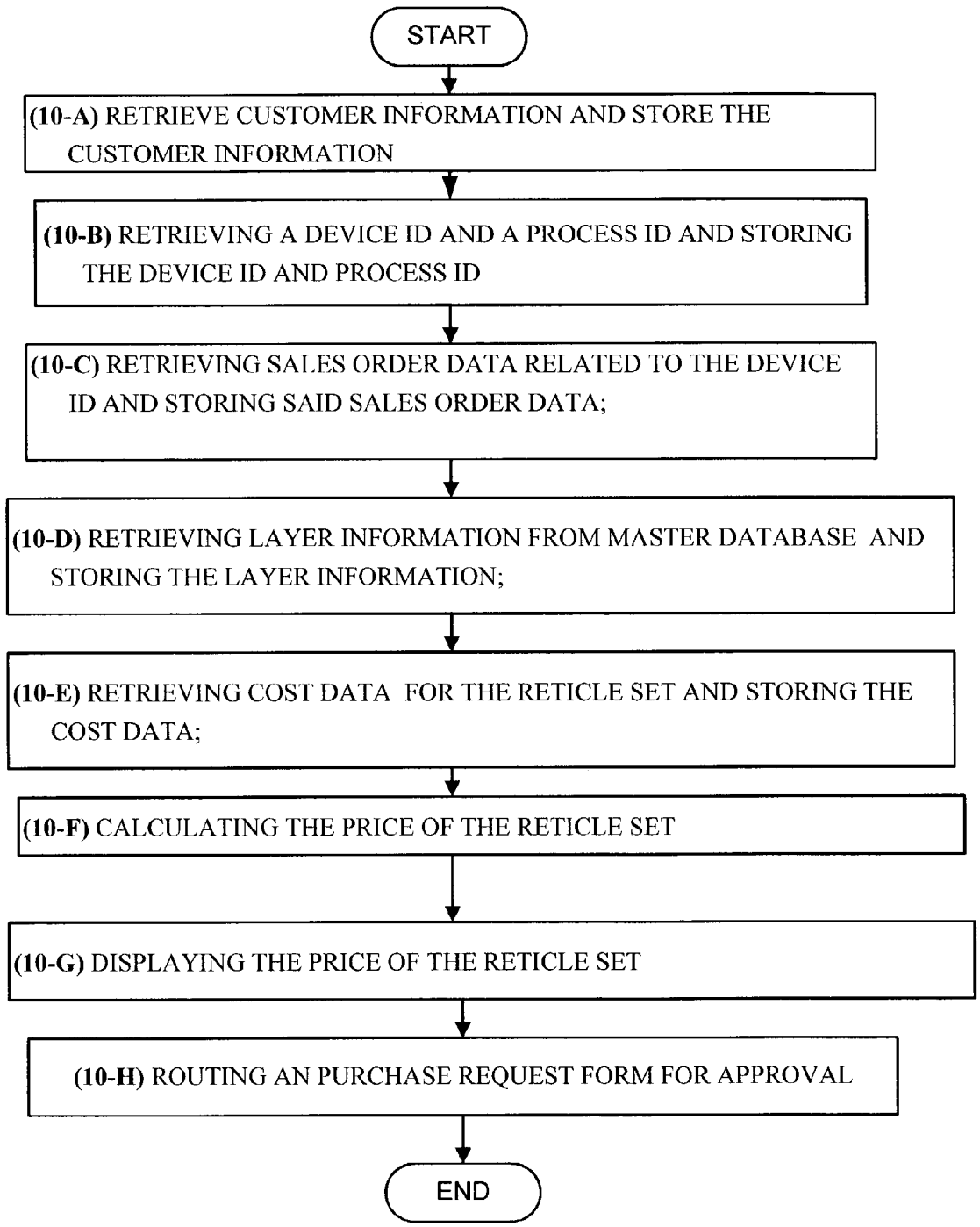
FIG. 1 shows a flowchart that illustrates one non-limiting example embodiment of the pricing system, method and apparatus of the present invention.

FIG. 1 shows a flowchart that illustrates one non-limiting example embodiment of the pricing system, method and apparatus of the present invention. The reticle set pricing system is preferably comprised of one or more software applications operating on one or more computers. For reference, FIG. 2A shows an example system include databases and applications. FIGS. 3A to 3F show example screen shots.

The system determines the price of a specific reticle set.

Step 10-A

Referring to FIG. 1, step 10-A, the system receives customer information for a specific requested reticle set that is being priced. The customer information is preferably received from a master data repository. The system could receive the customer information by a user entering the information. The system stores the customer information preferably in a pricing database or pricing data repository. The specific customer requested can be specified by a user and an example embodiment is discussed below and shown in FIGS. 3A to 3D.

The system can receive information by, for example, retrieving the information from a data base or by a user imputing the information.

Master Data Repository

The master data repository can be a database(s), a distributed database, or a distributed data management application (e.g., product data management). For example, the data repository can be a Windchill™ database or database management program by Parametric Technology Corp., 140 Kendrick Street, Needham, Mass. 02494, USA. The master data repository can contain multiple tables or databases. The master data repository can be used to store information retrieved from other systems/databases or users.

The customer information in the master database preferably comprises the following data model entities: customer name, customer id #, and device id numbers for reticle sets.

Pricing Database

The pricing database can be any electronic repository. The pricing database can be a data repository that can be database(s), a distributed database(s), or a distributed data management application (e.g., product data management). The system preferably stores "pricing related information" for the reticle sets in the pricing database. See e.g., FIG. 2B. In an example, each reticle set being priced can be a table in a pricing relational database. The pricing database can be part of the master data repository. In a non-limiting example, the pricing database can be part of a master database that is a Windchill™ database or database management program by Parametric Technology Corp., 140 Kendrick Street, Needham, Mass. 02494, USA.

Step 10-B

Referring to FIG. 1, step 10-B, the system retrieves and/or receives a specific requested device id and process id for the specified reticle set (e.g., for the reticle set being priced). The device id and process id are preferably retrieved from a master data repository. Then the device and process id are stored preferably in a pricing database. The specific requested device id and process id can be received by the system and/or selected by a user as shown in FIG. 3B.

The device id and process id information in the data base preferably comprises the following data model entities: device id; process id, and technology type. See e.g., FIG. 6.

The device id is unique for each reticle set being priced. The device id is preferably used as an index to store/retrieve information related to a specific reticle set preferably in the all databases used by the pricing system (e.g., master data repository, sales order/pricing database, and pricing database). Also, preferred embodiments of the device and process id are described below and in FIG. 6.

Preferably the process id is related to the device id from data created in the master data repository during a tapeout operation. The tapeout operation is where the layers/masks that make up a mask set are defined.

In an embodiment, the pricing database is part of the master data repository. That is the master data repository can include more than one database and can include the pricing database or data repository. In a preferred embodiment the master data repository has (process or layer) information from an automated tapeout support application.

Step 10-C

Referring to FIG. 1, step 10-C, the system retrieves and/or receives sales order/cost data for the reticle set from a sales order/cost database (SMO). The system preferably uses the specified device id to index the reticle set being priced to the data in the master database. The system stores the sales order/cost data retrieved for the reticle set (indexed by the device id) preferably in the pricing database. See e.g., FIG. 3D.

Sales Order Database

The sales order data in the sales order database preferably comprises data relating the sales order for the reticle set being priced. The sales order data in the sales order/cost database preferably comprises the following data model entities: device id, sales order #, sales amount, account number; whether customer is paying for mask production costs (recoverable); mask shop; and mask set delivery location. See e.g., FIG. 3D.

Step 10-D

Referring to FIG. 1, step 10-D, the system retrieves and/or receives "layer information" from master database related to the device id (reticle set being priced) and stores the layer information preferably in the pricing database. A layer is one reticle in a set of reticles used to make a chip or device. The layer information preferably comprises fields of features of the layers or reticles. A set of reticles is made up of one or more layers (or reticles).

The layer information in the master database preferably comprises the following data model entities: layer #, layer type/name, reticle grade, revision, OPC/PSM, magnification (MAG), spot size, CD cell size, description. See FIG. 3D.

The layer information is preferably stored in the master data repository by an automated tapeout application. This application is related to commonly assigned, copending U.S. patent application Ser. No. 10/389,718, filed Mar. 14, 2003, Inventors Kochpatcharin et al., entitled SYSTEM, APPARATUS AND METHOD FOR AUTOMATED TAPEOUT SUPPORT, commonly assigned which is hereby incorporated by reference which describes an automated tapeout system. The example system can be integrated as shown in FIG. 2B.

The layer information preferable was stored in the master data repository by an automated tapeout support system. See FIG. 2B. A layer is one reticle in a set of reticles used to make a chip or device. The pricing application uses the "layer information" in determine the price of the reticle set.

Step 10-E

Referring to FIG. 1, step 10-E, the system retrieves cost data for the layer information for the reticle set and stores the cost data. As shown in FIG. 2A, the cost data is preferably stored in a cost database.

The cost database contains cost data related to the cost of producing the masks or layers that make up the reticle sets. The cost data can include cost information for the factors that affect the cost of the reticle set. For example, the cost database can contain cost factors for the cost of producing a mask (or layer) at a particular mask shop. The cost data can contain cost factors for other variables such as: layer type, reticle grade, pellicle type, OPC/PSM, and magnification.

Step 10-F

Referring to FIG. 1, step 10-F, the system calculates the price of the reticle set. The total price of the reticle set can be the sum of the price of the individual reticles, (or masks or layers) to make up the reticle set. See FIG. 3D for an example screen shot of pricing 370 by layer. The price of each reticle can depend on many factors that are used to calculate the reticle price. For example, the type/name of the reticle/layer can be a factor as some reticles cost more to produce because of line density and technical difficulty with producing reticle. Other factors include reticle grade, pellicle type, OPC/PSM, magnification and the particular mask shop that will fabricate the masks. The cost data comprises cost factors used to calculate the price for these masks. For example, reticle grade is a measure of the quality of mask. The higher the quality the higher the cost. The cost data contains a cost factor for the reticle grade where the cost factor is higher for a more costly/higher reticle grade (e.g., cost factor=1.2 for a grade A vs 1.0 for a grade C). The reticle grade cost factor can be multiplied by a base number to determine the layer (or reticle) cost.

Step 10-G

Referring to FIG. 1, step 10-G, the system outputs or displays the price of the reticle set. See e.g., FIG. 3E.

Step 10-H

Referring to FIG. 1, step 10-H, in an optional step, the system can route an purchase order (PO) request form to various personnel for approval. The system preferably decides whether to route the PO or automatically approve the PO based on whether the customer of the reticle set has agreed to pay for the cost of producing the reticle set or if the cost of the reticle set will be pay for by the foundry. If the customer has agreed to pay for the reticle set, the system can automatically approve a purchase request (PR) and the PR can be issued. If the cost of the reticle set will be paid for by the foundry, the system can route the PR to the appropriate personnel for sign off and approval.

FIG. 2A

FIG. 2A is a diagram of a non-limiting example embodiment of the pricing system. FIG. 2 shows the pricing system comprises a computer system 20, a reticle pricing application 22, a master data repository 24, a sales order data repository 26, a cost data repository 27, a pricing data repository 28 and a user interface 29. The master data repository 24 can comprise the sale order data repository 26 and the pricing data repository 28. The computer system can be a computer or a network of computers for example connected by an internet and/or intranet. The data repositories 24 26, 27, 28 can be one or more separate databases. The reticle pricing application can be one or more software applications running on one or more computers. In a preferred embodiment, the reticle pricing application is a Windchill™ workflow software application by Parametric Technology Corp.

The user interface 29 is preferably a web browser. Also, see FIGS. 3A to 3F for examples of the interfaces.

FIG. 2B

FIG. 2B is a diagram of a system of a non-limiting example embodiment of the pricing system having an automated tapeout support application 35A connected to the master database 24B. FIG. 2B shows a system 20A, and a reticle pricing application 22A.

FIG. 2B also shows an example where the master data repository 24A contains a layer Info database (DB) 31A, and a pricing database (DB) 28A.

Also, the sales order DB 26A and cost DB 27A are part of a sales data base 33A. The sales order database 26A and the cost database 27A can be contained in the same data repository.

FIG. 2B also shows an example the automated tapeout support system/application 35A that is connected to a device info DB 35B, a process info DB 35C and design info DB 35D. The device info DB, process info DB and design info DB contain info (information) related to the mask design and tapeout process. The automated tapeout support system 35A is connected to the master data repository 24A and the layer info DB 31A (where the layer information is preferably stored).

In a preferred embodiment, the reticle pricing application is a Windchill™ workflow software application by Parametric Technology Corp.

Example Screen Shots—FIGS. 3A to 3F

FIGS. 3A to 3F show example displays or screen shots in accordance with a non-limiting example embodiments of the invention. Preferably, the displays are web pages. For simplicity only portions of the webpages are shown.

Figure 3A:
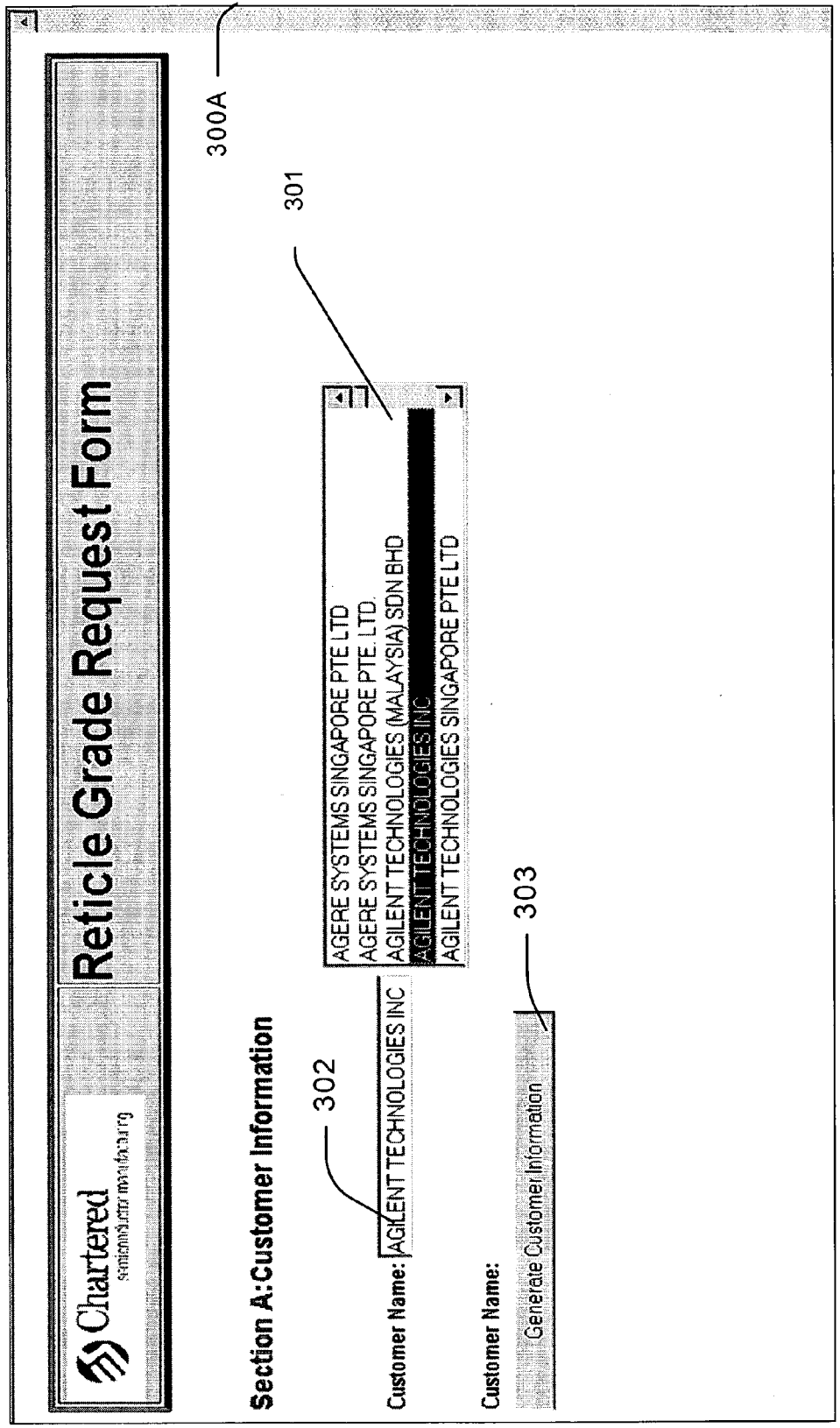

FIG. 3A shows a display where customer information can be entered. FIG. 3A shows a screen 300A. Also see FIG. 1, step 10-A. The screen is preferably a webpage. A user can select a customer name from the customer name list 301 and the customer name is displayed in field 302. The customer names are preferably retrieved from the master data repository (See FIGS. 1 and 2A). A user can click on the button 303 to request the system to retrieve customer information and store the customer information.

FIG. 3B shows a preferred next screen 300B where the customer id 306 is retrieved preferably from the master data repository and displayed at the top of the screen. Also, see FIG. 1, step 10-A.

FIG. 3B shows in a device information section, a drop down list 308 for selecting the specific device id from the master database and an area 310 for displaying the selected device id or typed in device id. See FIG. 1, step 10-A. A user can select a specific device id for the specific reticle set being priced. This device id is used to retrieve, for a specific reticle set, various types of information from the master repository and other data repositories.

The system retrieves a process id for the selected device id and displays the process id in field 314. FIG. 3B also shows a list 312 for manually selecting a process id from the master database and an area 314 for displaying the selected process id. A user can click on the button 316 to request the system to retrieve information related to the device id and process id and to generate the next screen.

FIG. 3C shows a preferred next screen 300C where the device id 310, process id 314 and technology 322 are preferably retrieved from the master database and displayed at the top of the screen. Also see FIG. 1, step 10-C. Also see FIG. 6.

FIG. 3C shows a sales order list 324 for selecting the sale order number and an area 326 for displaying the selection. The system preferably retrieves sales order data from the sale order database related to the specific sales order number selected.

FIG. 3C shows a display field where the sales order amount 328 is displayed.

Radio buttons 330 allow a user to select whether the order is recoverable (yes or no). That is, an order is recoverable if the customer is paying for mask production costs. If the order is recoverable, the system can assign a charge account number to the account number field 332.

Drop down list button 334 allows a user to select a mask shop which will make the masks.

List 336 allows a user to select a delivery location for the masks. Field 338 displays the delivery location selected. The delivery location can be retrieved from the master database. The user can change the delivery location stored in the master database.

The layer information section 340 is shown at the bottom of screen 300C. The layer information table 342 can be displayed by scrolling down in the screen by using a scroll bar as is common on web browsers and is shown in FIG. 3D.

FIG. 3D shows an example screen shot of the layer information section 340 and table 342 preferably after the preceding screen (FIG. 3C) is scrolled down. The layer information is preferably retrieved from the master data repository and is related to (or indexed) by the device id number. See FIG. 1, step 10-d. In a preferred embodiment, the layer information is retrieved from a Promis runsheet, a Bias table, a reticle grade table and a reticle quotation. The layer information can be generated by an automated support tapeout program.

The layer table 342 preferably shows the following information: selection checkbox (check means selected) 350, layer number 352, layer type/name 354, pellicle type 356, reticle grade 358, revision 360, OPC/PSM 362, mag (magnification) 364, spot size 366, CD cell size 368, price 370 (of the layer, preferably calculated by the system) and description 372.

The layer information can be edited by the user in this screen or other screens. The system can include checks on the data or edited data. For example, the system/application can allow a user to increase the reticle grade to a higher level than the reticle grade stored in the master database. Preferably the system will not allow a user to lower the reticle grade to a lower level than is required by the device.

Also, the reticle price is preferably determined by retrieving cost factors from a cost database (e.g., SMO database). See FIG. 1, step 10-D. The pricing factors can include, the layer name/type, reticle grade, the mask shop, and the delivery location.

Figure 3E:
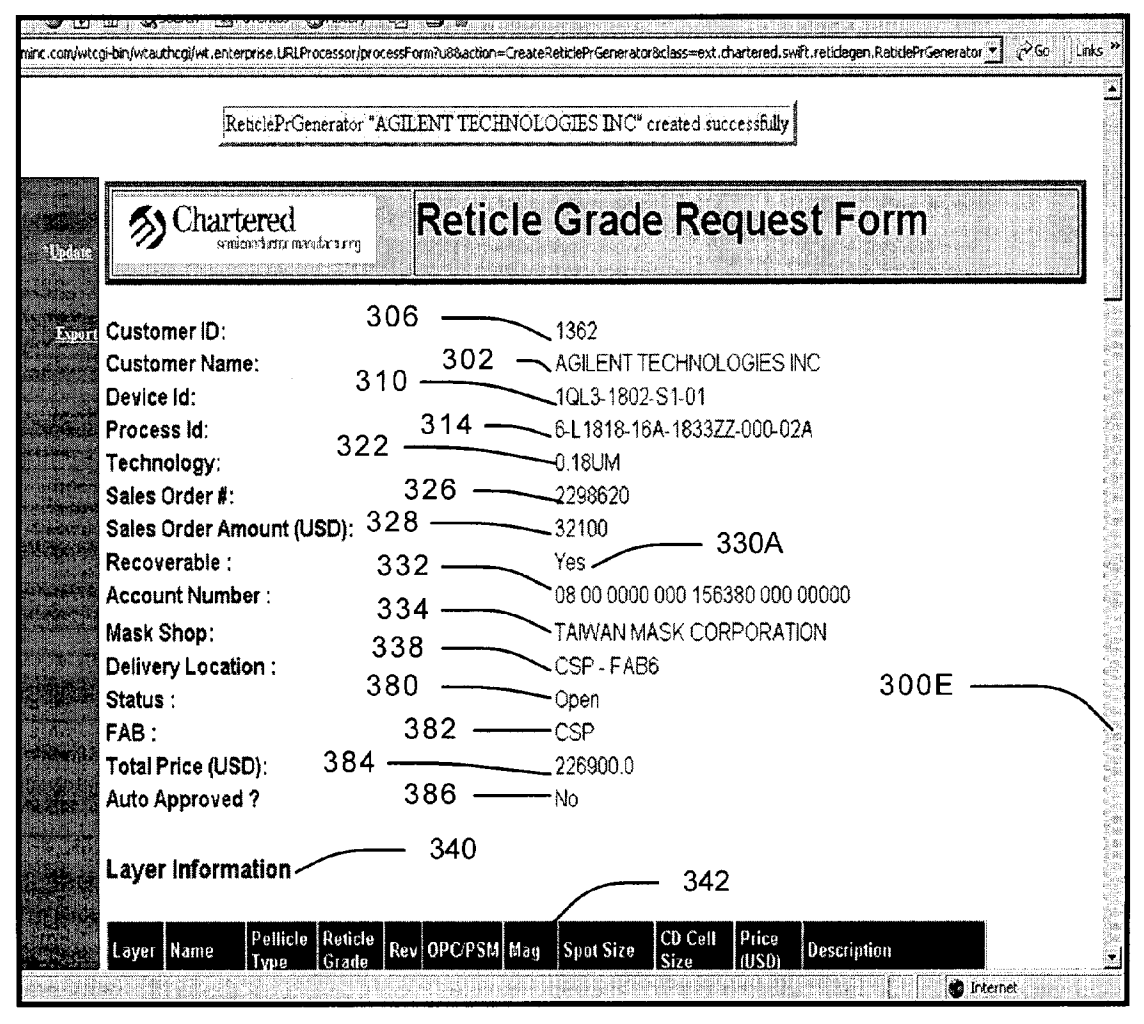

FIG. 3E shows the subsequent screen shot where the layer information is finalized and a total price 384 for the reticle set is determined and displayed. Also, see FIG. 1, step 10-G. Other fields displayed include: Status field 380, Fab field 382, total price 384 and auto approve 386.

FIG. 4

Figure 4:
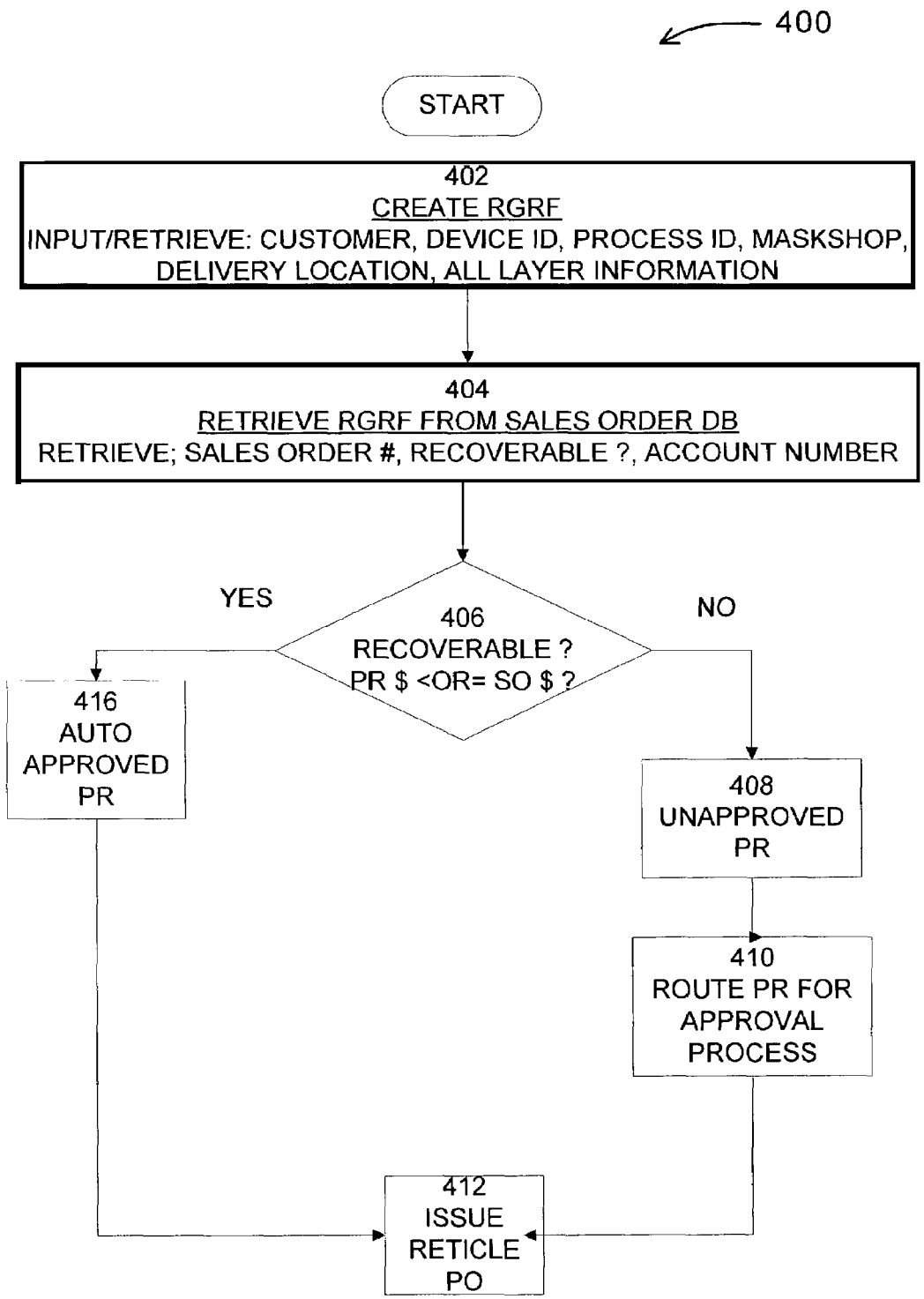
FIG. 4 shows a flowchart for a non-limiting example embodiment of the invention.

FIG. 4 shows a diagram 400 for a non-limiting example embodiment of the invention. FIG. 4 shows another diagram of example steps for entering and retrieving data and the example type of personnel interact with the system.

Referring to Step 402, entitled Create RGRF, the field engineer (FE) preferably enters and/or retrieves the specific customer, device, process id, maskshop, delivery location and layer information.

Referring to step 404, entitled "retrieve RGRF from sale order DB", a customer service representative (CSR) preferably inputs or selects specific sales order #, recoverable, account number information related to the specific device id. The system calculates a total price for the reticle set.

Referring to step 406, if sales order amount (the amount the customer will pay for the reticle set) is greater than or equal to the total price of mask set, the system automatically approves the purchase requisition (PR). See step 416.

If the sales order amount (the amount the customer will pay for the reticle set) is less than the total price (cost) of mask set, then system routes the PR to personnel (e.g., CSR) for approval). See steps 406, 408 & 410. If the PR is approved a purchase order (PO) is issued (See step 412) preferably by a person from the sale management office (SMO)).

Figure 5A:
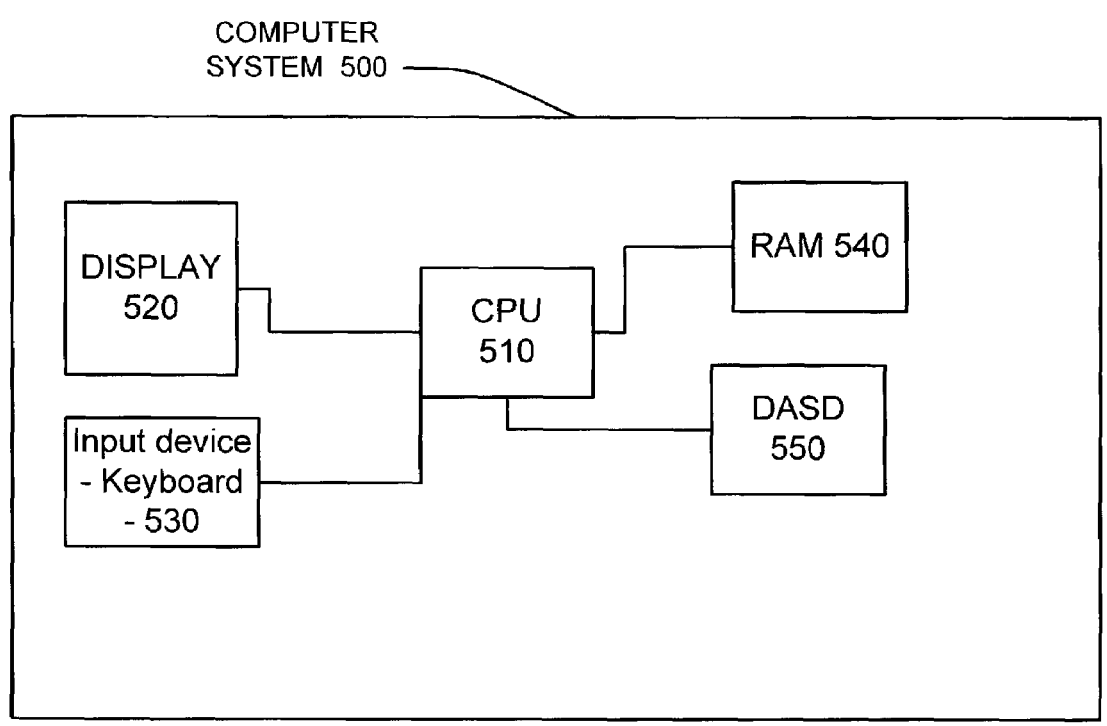
FIG. 5A shows a diagram of a non-limiting example embodiment of a computer that can be used in an embodiment of the invention.
Figure 5B:
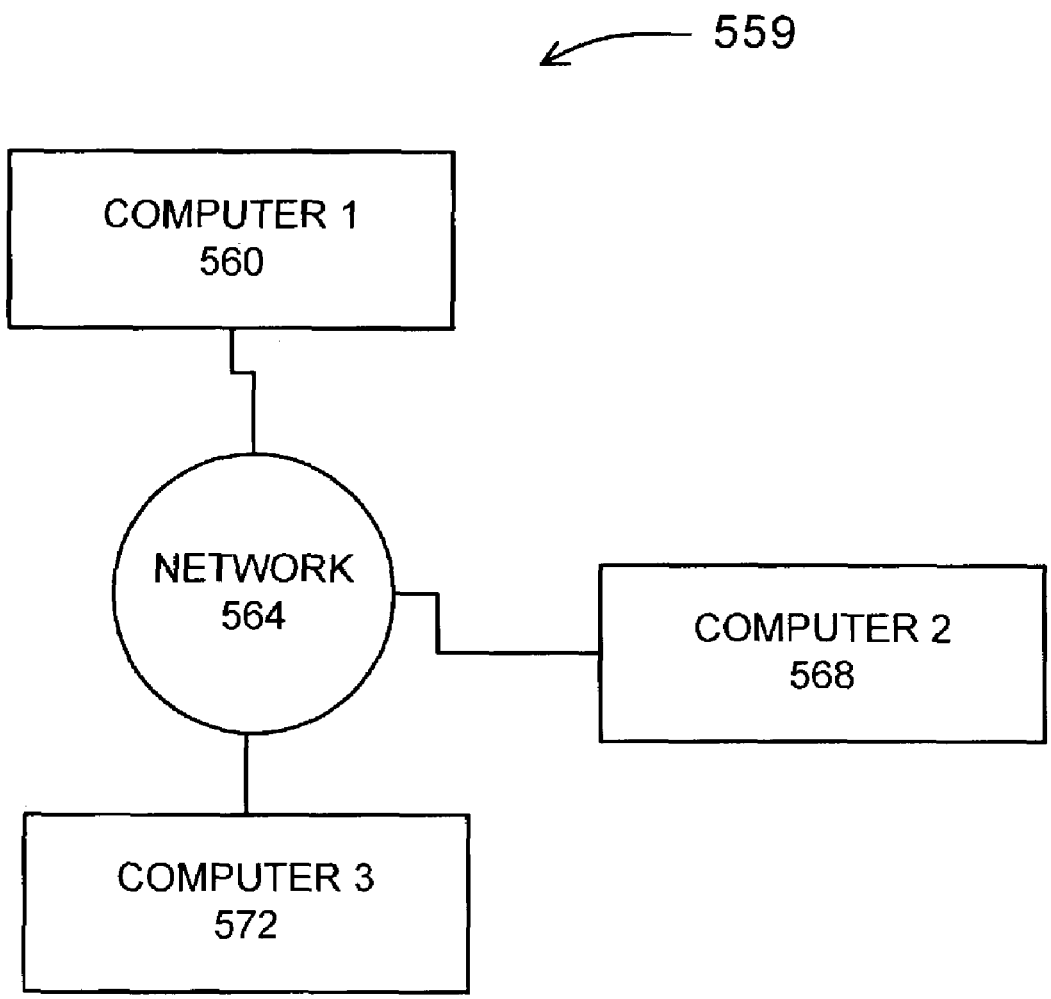
FIG. 5B shows a diagram of a non-limiting example embodiment of a computer system that can be used in an embodiment of the invention.

FIGS. 5A and 5B

FIG. 5A shows a diagram of a non-limiting example embodiment of a computer that can be used in an embodiment of the invention. Referring to FIG. 5A, the computer system 500 shown comprises a CPU (Central Processing Unit) 510, a terminal with a monitor 520 connected to the CPU 510 for receiving data from the CPU 510 and a input device (e.g., keyboard) 530 connected to the CPU 510 for sending data respectively to the CPU 510. A RAM (Random Access Memory) 540 and a DASD 550 associated with the CPU are shown connected for bidirectional communication of data to and from CPU. The reticle pricing application can run on the computer system or more than one computer system.

FIG. 5B shows a diagram of a non-limiting example embodiment of a computer system that can be used in an embodiment of the invention. FIG. 5B shows an example of a computer system 559 upon which the system can operation. FIG. 5B shows a first computer 560, second 568 and third 572 computers connected to a network 564. The reticle pricing application can run on one or more of the computers. The network can be intranet, internet or other network. The data repositories or databases can be located on one or more computers. The computers 560 569 572 can be configured similarly to the above described computer system 500 in FIG. 5A.

FIG. 6

Figure 6:
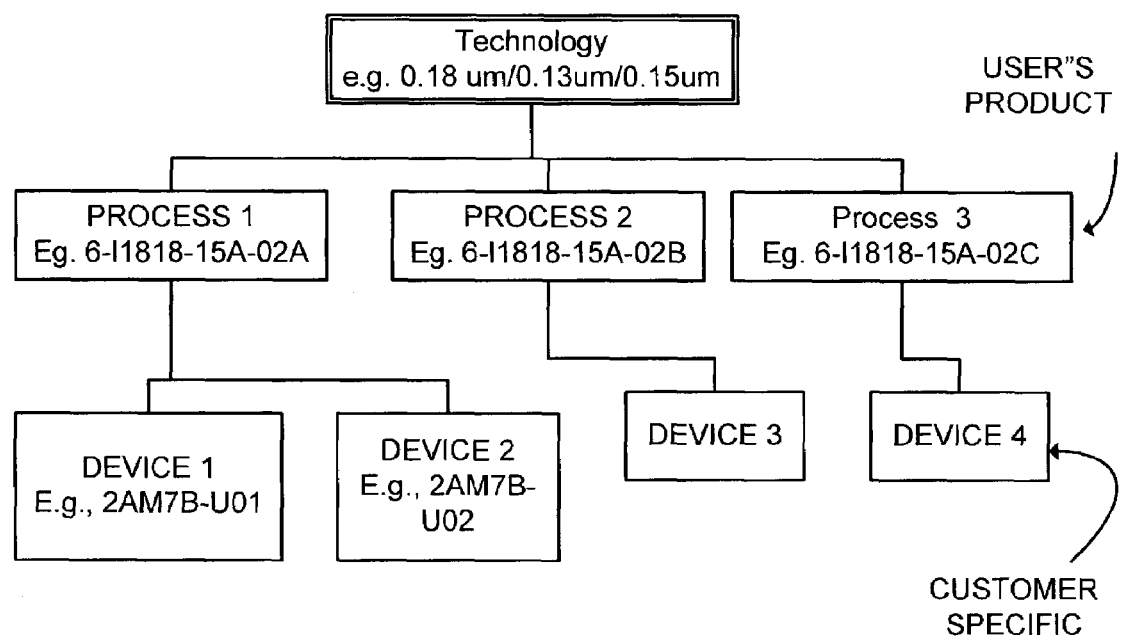
FIG. 6 shows a diagram of a non-limiting example embodiment of a data structure for a master data base including technology, process and device id indexes.

FIG. 6 shows a diagram of a non-limiting example embodiment of a data structure for a master data base including technology, process and device id indexes. FIG. 6 shows an overview of the foundry (user's) standards. For a reticle technology (e.g., 0.18 µm), various reticle processes are defined. The process have many standards such as groundrules, the number of metal layers, etc. When a customer orders a device and mask set to be made, a technology is selected, then a process is selected. Then customer specific standards are specified by the device design. Lastly, a device id # is assigned the specific reticle set designed for the customer's device.

Software

The reticle set pricing management system is preferably comprised of a workflow application such as Windchill™ by Parametric Technology Corp. The workflow application an interact with other applications and databases. The workflow program can send and receive communications with persons such as company personnel, customers, field engineers, and account managers.

Example Embodiment Features

Example embodiments of a method, apparatus and system are provided for collecting data and initiating a mathematical and rule based calculation tasks that will look-up and calculate the component and subcomponent pricing to arrive at a final reticle price.

Example embodiments of the processing system allows the user to enter or select the reticle request information via the intranet. At the time of input, an example embodiment system automatically pulls out the process device, layer info, layer #, reticle grade and reticle price from the source systems to prepare for the computational requirements. With this, the latest data is used real time and from a single consistent source, thereby reducing inaccuracy due to transcription and different data versions. It increase response time and reduce labor. The final pricing is determined and presented to the user. This price determination reduces data inaccuracy and improves response time.

In an example embodiment, based on the pricing presented to the user, the user indicates whether the cost is recoverable. Upon pressing a submit button on the form, the data system applies a set of business rules to decide whether it should automatically send the required file to trigger that creation of either an approved PR or generate a standard PR. If the price is recoverable and the purchase Requisition amount is less than the sales order amount, an approved PR as well as it purchase order (PO) are automatically generated.

A final output is the generation of a reticle purchase order (PO) with pricing.

This system, method, apparatus can be used by any organization to determine a price for reticles and is not limited to foundries. Also a reticle set can comprise one or more reticles.

The system can receive information by, for example, retrieving the information from a data base or by a user imputing the information.

Below are brief non-limiting descriptions of terms:

reticle—photolithography mask used in manufacture.

layer—one reticle or mask.

reticle set—a group of photolithographic masks that are used to manufacture a specific device or chip.

Mask shop—organization that produces reticle sets. Can be a group within the foundry company or a separate company.

database—is any data repository for storing and retrieving data, such as a relational database, a table(s) in a relational database, a distributed database, etc.

data repository—is any repository for storing and retrieving data.

It should be understood that the above description is only representative of illustrative embodiments. For the convenience of the reader, the above descriptions have focused on a representative sample of all possible embodiments, a sample that teaches the principles of the invention. The description has not attempted to exhaustively enumerate all possible variations. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that the embodiments and variations shown and described herein are merely illustrative of the principles of this invention and that various modifications may be implemented without departing from the scope and spirit of the invention.

What is claimed:

1. A computer implemented method for determining a price of a reticle set comprising the steps of:

a) receiving customer information for said reticle set and storing said customer information;

b) receiving sales order data for said reticle set and storing said sales order data;

c) receiving layer information for said reticle set and storing said layer information, wherein said layer information comprises the following information: layer number, layer type/name, reticle grade, revision, OPC/PSM, magnification, spot size, CD cell size, and description;

d) receiving cost data for said layer information for said reticle set and storing said cost data;

e) determining a price of said reticle set using said layer information, said sales order data, and said cost data; and storing said price of said reticle set; and f) outputting said price of said reticle set.

2. The method of claim 1 which further includes after step (a): retrieving and/or receiving a device id and a process id for said reticle set, and storing said device id and said process id.

3. The method of claim 1 which further includes after step (a): retrieving a device id and a process id from a master data repository for the reticle set and storing said device id and process id in a pricing database; and said master data repository comprises said pricing database.

4. The method of claim 1 which further includes routing a purchase request form for the reticle set for approval.

5. The method of claim 1 wherein step (b) further comprises: retrieving said sales order data for the reticle set from a sales order database and storing said sales order data in a pricing database.

6. The method of claim 1 wherein step (d) further comprises: retrieving said cost data for the layer information for the reticle set from a cost database and storing said cost data in a pricing database.

7. The method of claim 1 wherein step (c) further comprises: retrieving said layer information for the reticle set from a master data repository and storing said layer information in a pricing database.

8. The method of claim 1 wherein an automated tapeout support system provides said layer information.

9. The method of claim 1 wherein an automated tapeout support system provides said layer information from a device information database, a process information database and a design information database, related to a mask set design and a tapeout process.

10. A computer implemented method for determining a price of a reticle set comprising the steps of:

a) retrieving and/or receiving customer information for said reticle set and storing said customer information in a pricing database;

b) retrieving and/or receiving a device id and a process id for said reticle set and storing said device id and said process id;

c) retrieving and/or receiving sales order data for the reticle set and storing said sales order data;

d) retrieving layer information for the reticle set from a master data repository and storing said layer information in said pricing database, wherein said layer information comprises the following information: layer number, layer type/name, reticle grade, revision, OPC/PSM, magnification, spot size, CD cell size, and description;

e) retrieving cost data for the layer information for the reticle set and saving said cost data;

f) calculating a price of the reticle set using said layer information, said sales order data, and said cost data; and storing the price of the reticle set in said pricing database; and g) displaying said price of the reticle set.

11. The method of claim 10 which further includes: routing a purchase request form for the reticle set for approval.

12. The method of claim 10 wherein step (a) further comprises: retrieving said customer information from the master data repository for said reticle set and storing said customer information in said pricing database.

13. The method of claim 10 wherein step (b) further comprises: retrieving a device id and a said process id from said master data repository for the reticle set; and storing said device id and said process id in said pricing database.

14. The method of claim 10 wherein step (e) further comprises: retrieving said cost data for the layer information for the reticle set from a cost database and saving said cost data in said pricing database.

15. The method of claim 10 wherein an automated tapeout support system provides said layer information from a device information database, a process information database and a design information database; said layer information is related to a mask design and a tapeout process.

16. One or more processor readable storage devices having processor readable code embodied on said process readable storage devices, said processor readable code for programming one or more processors to perform a method of determining a price of a reticle set; the method comprising the steps of:

a) receiving customer information for a reticle set and storing said customer information;

b) receiving sales order data for the reticle set and storing said sales order data;

c) receiving layer information for the reticle set and storing said layer information, wherein said layer information comprises the following information: layer number, layer type/name, reticle grade, revision, OPC/PSM, magnification, spot size, CD cell size, and description;

d) receiving cost data for the layer information for the reticle set and saving said cost data;

e) determining a price of said reticle set using said layer information, said sales order data, and said cost data; and storing the price of the reticle set; and f) outputting the price of said reticle set.

17. The device of claim 16 which further includes after step (a): receiving a device id and a process id for said reticle set and storing said device id and process id.

18. The device of claim 16 which further includes routing a purchase request form for the reticle set for approval.

19. The device of claim 16 wherein step (a) further comprises: retrieving said customer information for said reticle set from a master data repository and storing said customer information in a pricing database.

20. The device of claim 16 wherein step (b) further comprises: retrieving said sales order data for the reticle set from a sales order database and storing said sales order data in a pricing database.

21. The device of claim 16 wherein step (d) further comprises: retrieving said cost data for the layer information for the reticle set from a cost database and saving said cost data in a pricing database.

22. The device of claim 16 wherein an automated tapeout support system provides the layer information.

23. The device of claim 16 wherein an automated tapeout support system provides said layer information from a device information database, a process information database and a design information database, related to a mask design and a tapeout process.

24. A computer system for determining a price of a reticle set comprising:

a) means for receiving customer information for a reticle set and storing said customer information;

b) means for receiving sales order data for the reticle set and storing said sales order data;

c) means for retrieving layer information for the reticle set and storing said layer information, wherein said layer information comprises the following information: layer number, layer type/name, reticle grade, revision, OPC/PSM, magnification, spot size, CD cell size, and description;

d) means for retrieving cost data for the layer information for the reticle set and saving said cost data;

e) means for determining a price of said reticle set using said layer information, said sales order data, and said cost data; and storing the price of the reticle set; and f) means for outputting the price of said reticle set.

25. The computer system of claim 24 which further includes: a means for retrieving a device id and a process id from a master data repository for the reticle set and for storing said device id and process id in a pricing database.

26. The computer system of claim 24 which further includes a means for routing a purchase request form for the reticle set for approval.

27. The computer system of claim 24 which further includes an automated tapeout support system means for providing said layer information.

28. The computer system of claim 24 wherein the means for retrieving layer information further comprises: a means for retrieving said layer information for the reticle set from a master data repository and storing said layer information in a pricing database.

* * * * *